United States Patent
Hozumi et al.

(10) Patent No.: US 9,857,273 B2
(45) Date of Patent: Jan. 2, 2018

(54) MISFIRE DETECTING APPARATUS FOR INTERNAL COMBUSTION ENGINE

(75) Inventors: Tomoharu Hozumi, Wako (JP);
Masaaki Nagashima, Wako (JP);
Kiyonari Matsuda, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 1446 days.

(21) Appl. No.: 13/510,968

(22) PCT Filed: Nov. 19, 2010

(86) PCT No.: PCT/JP2010/070705
§ 371 (c)(1),
(2), (4) Date: May 21, 2012

(87) PCT Pub. No.: WO2011/086765
PCT Pub. Date: Jul. 21, 2011

(65) Prior Publication Data
US 2012/0239311 A1    Sep. 20, 2012

(30) Foreign Application Priority Data

Jan. 13, 2010  (JP) ................. 2010-004489

(51) Int. Cl.
*F02D 28/00*    (2006.01)
*G06F 19/00*    (2011.01)
(Continued)

(52) U.S. Cl.
CPC ......... *G01M 15/11* (2013.01); *F02D 41/1497* (2013.01); *F02D 2200/1015* (2013.01); *F02D 2250/14* (2013.01)

(58) Field of Classification Search
CPC ............. G01M 15/00; G01M 15/11; F02D 2200/1015; F02D 41/1498; Y02T 10/00; G01P 3/489
(Continued)

(56) References Cited

U.S. PATENT DOCUMENTS 5,440,922 A * 8/1995 Ichikawa ................... 73/114.04
5,539,644 A * 7/1996 Ichikawa et al. ............. 701/111
(Continued)

FOREIGN PATENT DOCUMENTS

JP          04-171249 A      6/1992
JP          2006-266253 A   10/2006
(Continued)

OTHER PUBLICATIONS

International Search Report corresponding to International Application No. PCT/JP2010/070705 dated Dec. 28, 2010.

*Primary Examiner* — John Breene
*Assistant Examiner* — Jeffrey Aiello
(74) *Attorney, Agent, or Firm* — Squire Patton Boggs (US) LLP

(57) ABSTRACT

A misfire detecting apparatus is provided wherein a misfire is detected based on a rotational speed parameter indicative of a rotational speed of an internal combustion engine. An average change amount of the rotational speed parameter in a first predetermined period and an inertia speed changing component which is generated with rotation of the engine are calculated, and a first corrected rotational speed parameter is calculated by correcting the rotational speed parameter according to the average change amount and the inertia speed changing component. A first relative speed parameter is calculated according to a difference between a first reference value and the first corrected rotational speed parameter, the first reference value being the first corrected rota- (Continued)

tional speed parameter corresponding to the rotational speed parameter which is detected at a reference timing at which a piston of a cylinder, which is subjected to the misfire determination, is positioned in the vicinity of the compression top dead center. A first determination parameter is calculated by integrating the first relative speed parameter for an integration period corresponding to 720/N degrees of a crank angle ("N" is a number of cylinders of the engine), and a misfire determination is performed based on the first determination parameter. The reference timing and a start timing of the integration period are set according to the ignition timing of the engine.

9 Claims, 8 Drawing Sheets

(51) Int. Cl.
*G01M 15/11* (2006.01)
*F02D 41/14* (2006.01)

(58) Field of Classification Search
USPC ............... 702/85, 108, 127, 83; 123/406.29, 123/406.26; 73/114; 701/110, 111
See application file for complete search history.

(56) References Cited

U.S. PATENT DOCUMENTS

| | | | |
|---|---|---|---|
| 6,345,499 B1* | 2/2002 | Nishimura et al. | 60/277 |
| 7,480,591 B2* | 1/2009 | Shikama et al. | 702/182 |
| 7,536,902 B2* | 5/2009 | Tsukamoto et al. | 73/114.04 |
| 7,614,290 B2* | 11/2009 | Shikama et al. | 73/114.25 |
| 7,877,192 B2* | 1/2011 | Shikama et al. | 701/111 |
| 2002/0014113 A1* | 2/2002 | Takaku et al. | 73/116 |
| 2002/0056315 A1* | 5/2002 | Takaku et al. | 73/116 |
| 2004/0237635 A1* | 12/2004 | Ohsaki et al. | 73/117.3 |
| 2007/0157713 A1* | 7/2007 | Tsukamoto et al. | 73/117.3 |
| 2008/0098806 A1* | 5/2008 | Shikama et al. | 73/119 R |
| 2008/0103681 A1* | 5/2008 | Shikama et al. | 701/111 |
| 2010/0294027 A1* | 11/2010 | Kondo et al. | 73/114.02 |

FOREIGN PATENT DOCUMENTS

| | | | |
|---|---|---|---|
| JP | 2006266253 A | * | 10/2006 |
| JP | 2007-198368 A | | 8/2007 |
| JP | 2008-111354 A | | 5/2008 |
| JP | 2008-215338 A | | 9/2008 |
| JP | 2009-191709 A | | 8/2009 |
| JP | 2009-191710 A | | 8/2009 |
| JP | 2009191709 A | * | 8/2009 |

* cited by examiner

[FIG. 1]
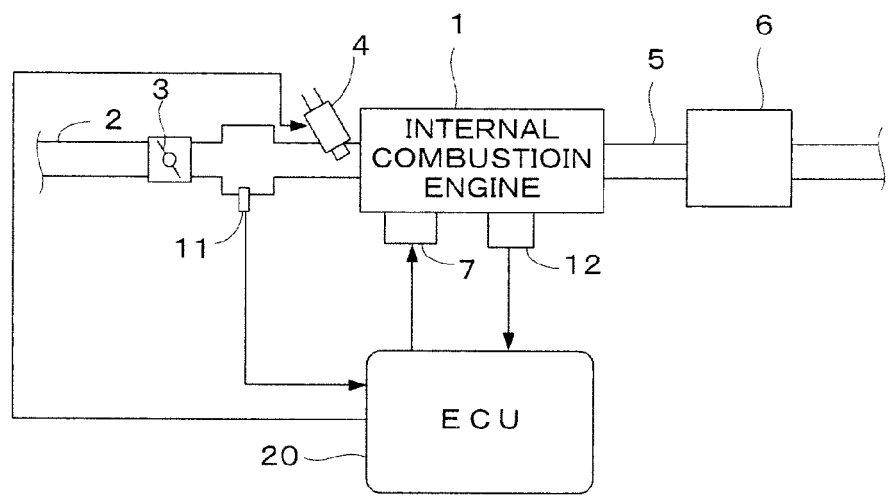
[FIG. 2]
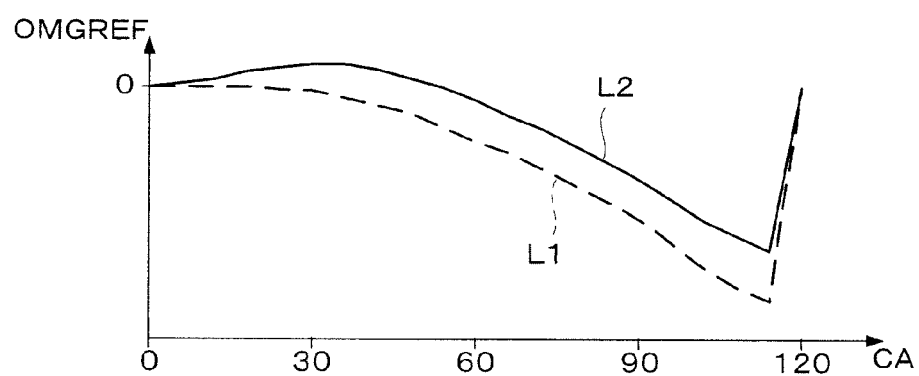

[FIG. 3]
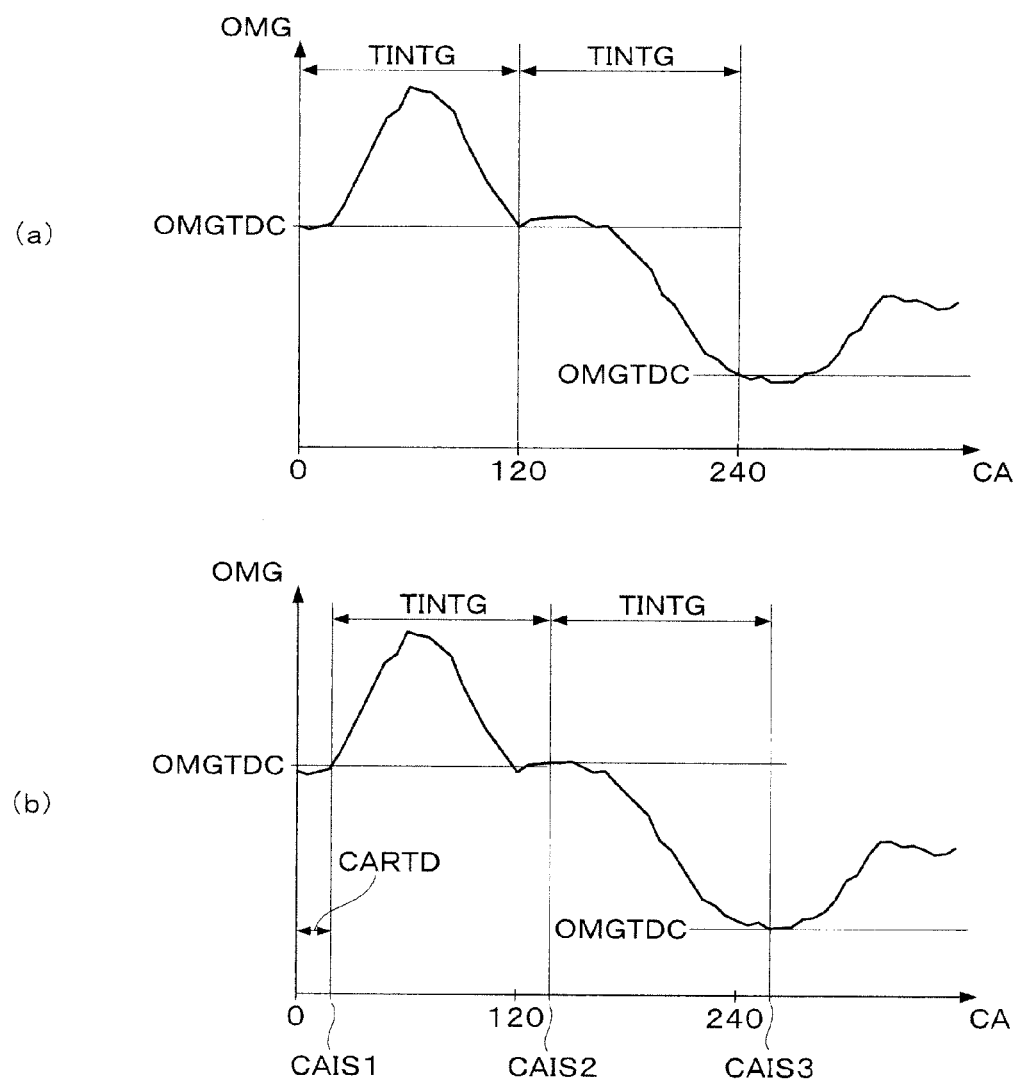

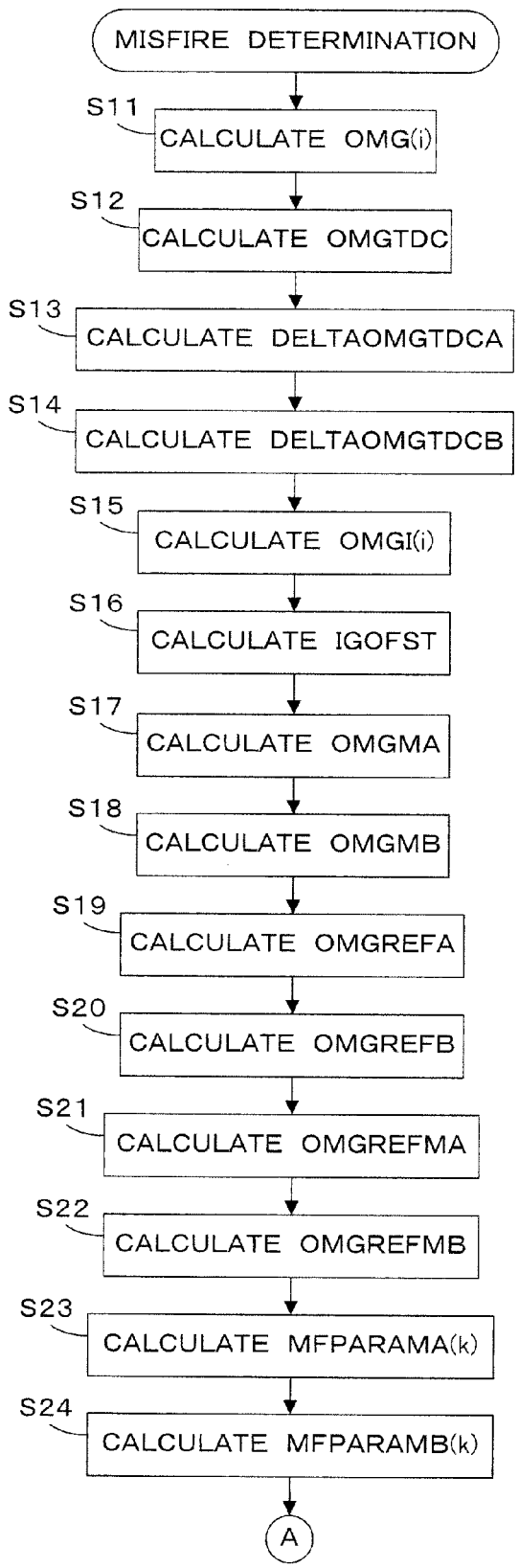
[FIG. 4]

[FIG. 5]
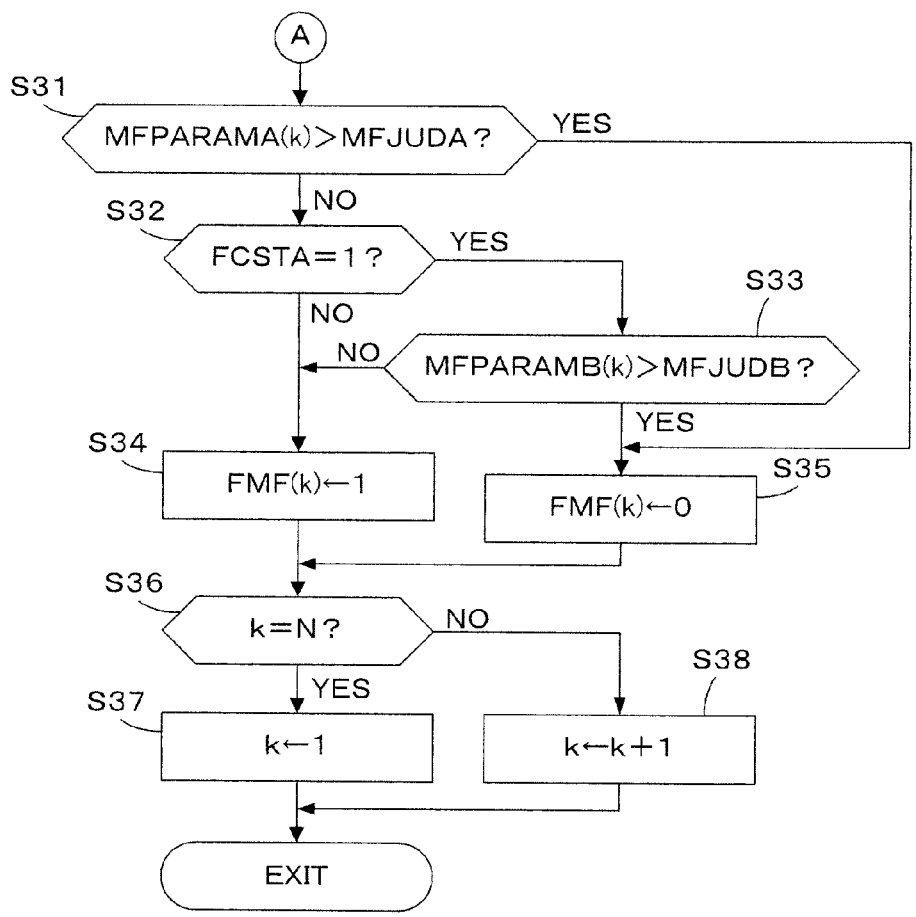

[FIG. 6]
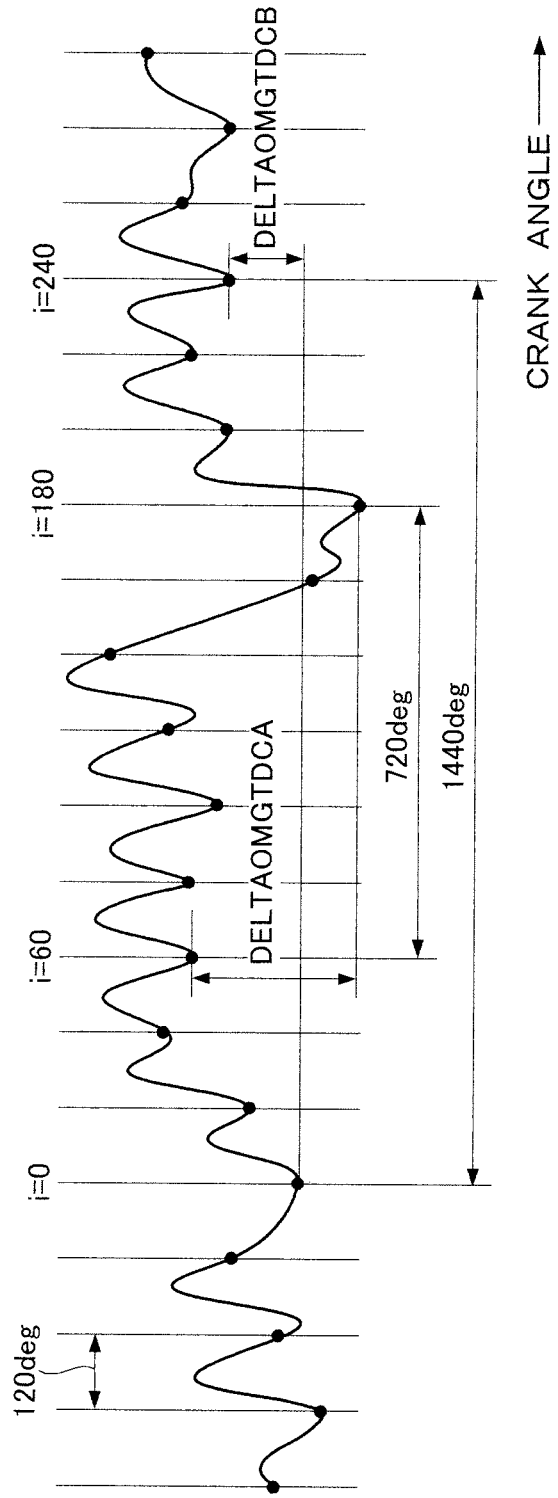

[FIG. 7]
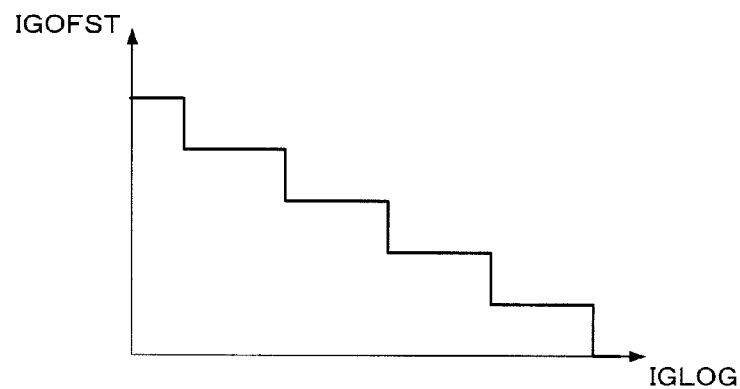
[FIG. 8]
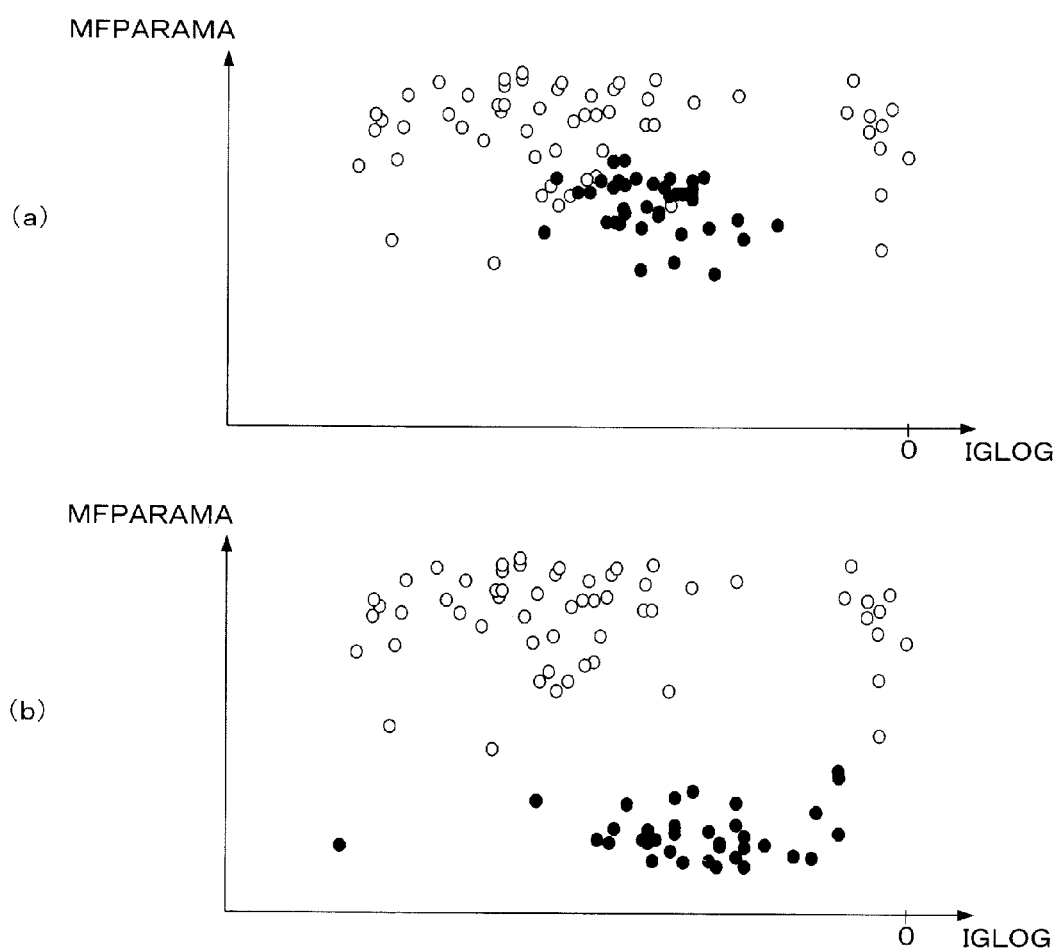

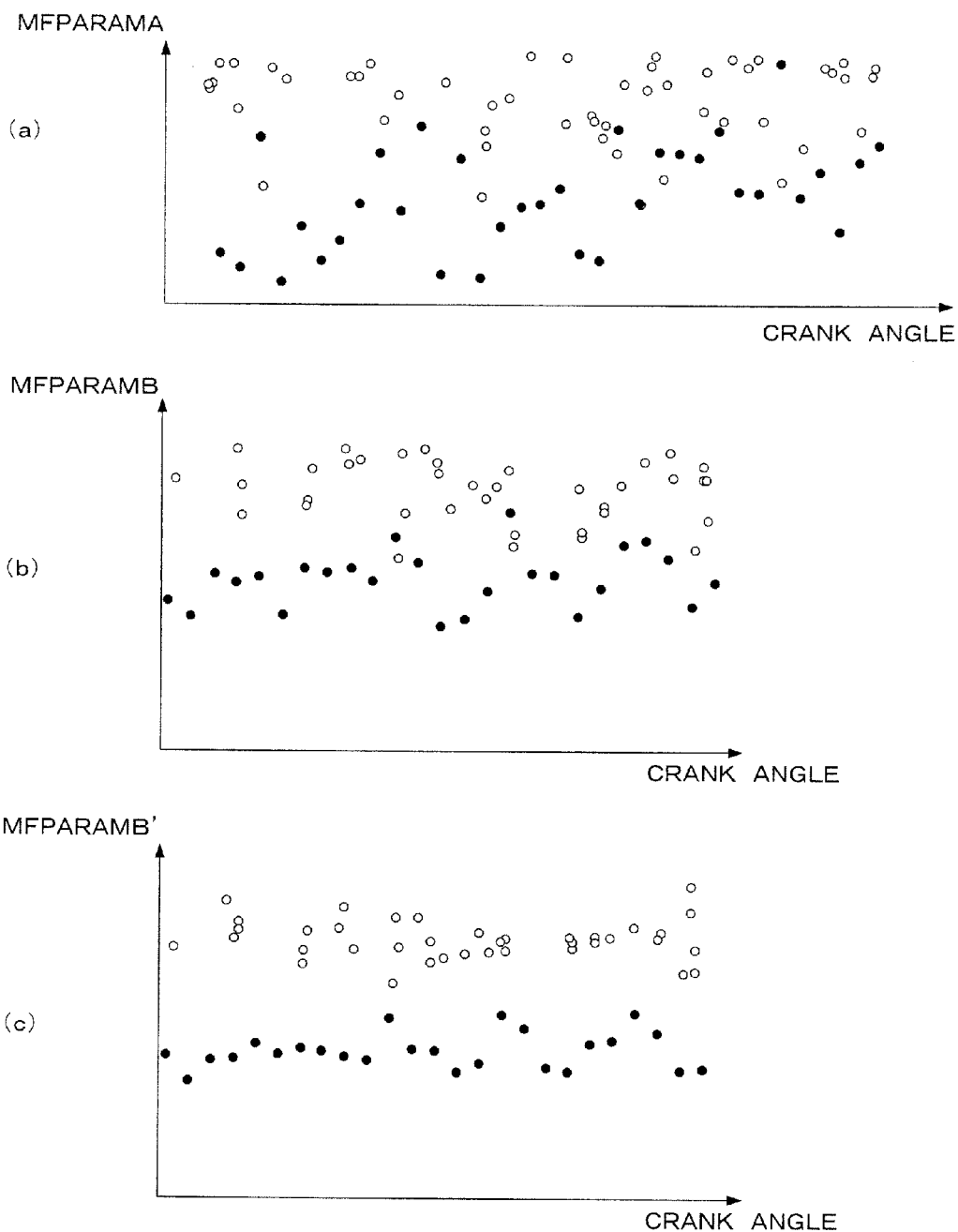

[FIG. 10]
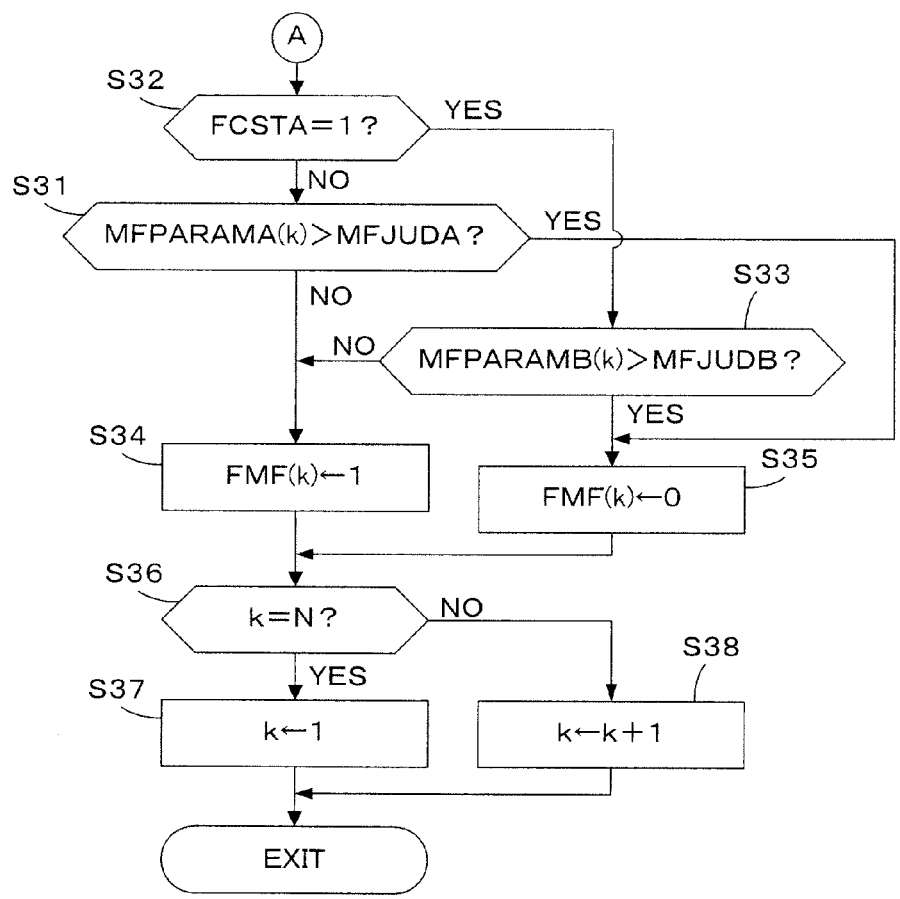

MISFIRE DETECTING APPARATUS FOR INTERNAL COMBUSTION ENGINE

TECHNICAL FIELD

The present invention relates to a misfire detecting apparatus for an internal combustion engine and, particularly, to a misfire detecting apparatus for determining whether a misfire occurs, based on a rotational speed parameter indicative of an engine rotational speed.

BACKGROUND ART

Patent document 1 shows an apparatus for determining a misfire during the warming-up operation of an engine according to a rotation change parameter indicative of changes in the engine rotational speed. According to this apparatus, the rotation change is calculated corresponding to the ignition timing of each cylinder, and a rotation change difference Nxd360 and a rotation change difference Nxd720 are further calculated. The rotation change difference Nxd360 is a difference between the rotation change of 360 degrees of the crank angle before and the present rotation change. The rotation change difference Nxd720 is a difference between the rotation change of 720 degrees of the crank angle before and the present rotation change. The misfire determination is performed based on the rotation change differences Nxd360 and Nxd720.

PRIOR ART DOCUMENT

Patent Document

Patent Document 1: Japanese Patent Laid-open No. 2006-266253

SUMMARY OF THE INVENTION

Problems to be Solved by the Invention

The engine rotational speed contains an inertia speed changing component which is a speed changing component inevitably generated with rotation of the engine. This inertia speed changing component changes depending on the piston position of each cylinder. According to the apparatus shown in Patent Document 1, the rotation change is calculated corresponding to the ignition timing. However, the inertia speed changing component is not taken into consideration in this calculation of the rotation change. Therefore, when the calculation timing of the rotation change changes due to the ignition timing change, an influence degree of the inertia speed changing component also changes, which may possibly deteriorate accuracy of the calculated rotation change.

Further, the apparatus of Patent Document 1 determines the misfire during the warming-up operation of the engine. Accordingly, the accelerating operating condition or the decelerating operating condition of the engine is not taken into consideration.

The present invention was made contemplating the above-described point, and an objective of the present invention is to provide a misfire detecting apparatus for an internal combustion engine, which can accurately perform the misfire determination regardless of changes in the engine operating condition.

Means for Solving the Problems

To attain the above objective, the present invention provides a misfire detecting apparatus for an internal combustion engine, having rotational speed parameter detecting means for detecting a rotational speed parameter (OMG) indicative of a rotational speed of the engine, and detecting a misfire of the engine based on the detected rotational speed parameter (OMG). The misfire detecting apparatus includes first correcting means for calculating an average change amount (DELTAOMGTDCA/4 $\pi$) of the rotational speed parameter (OMG) in a first predetermined period (a period corresponding to 720 degrees of the crank angle), and an inertia speed changing component (OMGI) which is generated with rotation of the engine, and calculating a first corrected rotational speed parameter (OMGMA) by correcting the rotational speed parameter (OMG) according to the average change amount (DELTAOMGTDCA/4 $\pi$) and the inertia speed changing component (OMGI); first relative speed parameter calculating means for calculating a first relative speed parameter (OMGREFMA) according to a difference between the first corrected rotational speed parameter (OMGMA) and a first reference value (OMGMATDC) which is the first corrected rotational speed parameter (OMGMA) corresponding to the rotational speed parameter (OMG) detected at a reference timing (IGOFST) at which a piston of a cylinder, which is subjected to the misfire determination, is positioned in the vicinity of the compression top dead center; first determination parameter calculating means for calculating a first determination parameter (MFPARAMA) by integrating the first relative speed parameter (OMGREFMA) for an integration period corresponding to 720/N degrees of a crank angle ("N" is a number of cylinders of the engine); and determining means for performing a misfire determination based on the first determination parameter. The misfire detecting apparatus is characterized in that the reference timing (IGOFST) and a start timing (IGOFST) of the integration period are set according to the ignition timing (IGLOG) of the engine.

With this configuration, the first corrected rotational speed parameter is calculated by correcting the rotational speed parameter according to the inertia speed changing component and the average change amount of the rotational speed parameter in the first predetermined period, and the first relative speed parameter is calculated according to a difference between the first corrected rotational speed parameter and the first reference value which is the first corrected rotational speed parameter corresponding to the rotational speed parameter detected at the reference timing at which the piston of the cylinder, which is subjected to the misfire determination, is positioned in the vicinity of the compression top dead center. Further, the first determination parameter is calculated by integrating the first relative speed parameter for the integration period of 720/N degrees of the crank angle. In addition, the reference timing and the start timing of the integration period are set according to the ignition timing. If the reference timing and the start timing of the integration period are set to a constant timing regardless of the ignition timing, the value of the first determination parameter upon occurrence of misfire approaches a value indicative of the normal combustion when the ignition timing is changed in the retarding direction. Accordingly, possibility of erroneous determination becomes higher. Therefore, setting the reference timing and the start timing of the integration period according to the ignition timing makes it possible to accurately perform the misfire determination regardless of the ignition timing.

Preferably, the misfire detecting apparatus further includes second correcting means for calculating an average change amount (DELTAOMGTDCB/8 $\pi$) of the rotational speed parameter (OMG) in a second predetermined period (a period corresponding to 1440 degrees of the crank angle) which is longer than the first predetermined period (the period corresponding to 720 degrees of the crank angle), and the inertia speed changing component (OMGI), and calculating a second corrected rotational speed parameter (OMGMB) by correcting the rotational speed parameter (OMG) according to the average change amount (DELTAOMGTDCB/8 π) and the inertia speed changing component (OMGI); second relative speed parameter calculating means for calculating a second relative speed parameter (OMGREFMB) according to a difference between the second corrected rotational speed parameter (OMGMB) and a second reference value (OMGMBTDC) which is the second corrected rotational speed parameter corresponding to the rotational speed parameter (OMG) detected at the reference timing (IGOFST); and second determination parameter calculating means for calculating a second determination parameter (MFPARAMB) by integrating the second relative speed parameter (OMGREFMB) for the integration period. The determining means preferably performs the misfire determination based on the second determination parameter (MFPARAMB) when the engine is in a predetermined operating condition (FCSTA=1), and the determining means performs the misfire determination based on the first determination parameter (MFPRAMA) when the engine is in an operating condition other than the predetermined operating condition.

With this configuration, the second corrected rotational speed parameter is calculated by correcting the rotational speed parameter according to the inertia speed changing component and the average change amount of the rotational speed parameter in the second predetermined period which is longer than the first predetermined period, and the second relative speed parameter is calculated according to a difference between the second corrected rotational speed parameter and the second reference value which is the second corrected rotational speed parameter corresponding to the rotational speed parameter detected at the reference timing. Further, the second determination parameter is calculated by integrating the second relative speed parameter for the integration period. The misfire determination is performed based on the second determination parameter when the engine is in the predetermined operating condition, and the misfire determination is performed based on the first determination parameter when the engine is in the operating condition other than the predetermined operating condition. As to a cylinder other than the cylinder in which the irregular combustion (which is not the misfire but generates less torque compared with the normal combustion) has abruptly occurred, the second corrected rotational speed parameter, which is calculated according to the average change amount in the second predetermined period which is comparatively long, is hardly affected by the irregular combustion. Accordingly, by using the second determination parameter, the misfire determination can accurately be performed in the operating condition (the predetermined operating condition) where the irregular combustion may easily occur. Further, by performing the misfire determination using the first determination parameter, which is based on the first corrected rotational speed parameter calculated according the average change amount in the first predetermined period, in the operating condition other than the predetermined operating condition, the misfire determination can accurately be performed, for example, in the transient operating condition of the engine.

Preferably, the predetermined operating condition is a warming-up idling operating condition immediately after a cold start of the engine. With this configuration, the misfire determination can accurately be performed by distinguishing the misfire from the irregular combustion in the warming-up idling operating condition immediately after the cold start of the engine.

BRIEF DESCRIPTION OF THE DRAWINGS

FIG. 1 shows a configuration of an internal combustion engine and a control system therefor according to one embodiment of the present invention.

FIG. 2 is a time chart showing changes in a relative rotational speed (OMGREF) in the combustion stroke of the misfire cylinder.

FIG. 3 shows time charts for illustrating the integration period (TINTG) in the embodiment.

FIG. 4 is a flowchart of a process for performing the misfire determination.

FIG. 5 is a flowchart of a process for performing the misfire determination.

FIG. 6 is a time chart for illustrating the process of FIGS. 4 and 5.

FIG. 7 shows a table referred to in the process of FIG. 4.

FIG. 8 shows graphs for illustrating the improvement effect regarding changes in the ignition timing.

FIG. 9 shows time charts for illustrating the improvement effect regarding abruptly-occurred irregular combustion.

FIG. 10 is a flowchart of a modification of the process shown in FIG. 5.

MODE FOR CARRYING OUT THE INVENTION

Preferred embodiments of the present invention will now be described with reference to the drawings.

FIG. 1 is a schematic diagram of an internal combustion engine and a control system therefor according to one embodiment of the present invention. The internal combustion engine 1 (hereinafter referred to as "engine") has six cylinders and is provided with an intake pipe 2 and an exhaust pipe 5. The intake pipe 2 is provided with a throttle valve 3. The exhaust pipe 5 is provided with a catalytic converter 6 for purifying exhaust gases.

A fuel injection valve 4 is provided for each cylinder at a position slightly upstream of an intake valve (not shown) in the intake pipe 2 and between the engine 1 and the throttle valve 3. Each fuel injection valve 4 is connected to a fuel pump (not shown) and electrically connected to an electronic control unit 20 (hereinafter referred to as "ECU 20"). A valve opening period of the fuel injection valve 4 is controlled by a control signal from the ECU 20.

An ignition plug 7 of each cylinder of the engine 1 is connected to the ECU 20, and the ignition timing is controlled by a ignition signal from the ECU 20.

An intake pressure (PBA) sensor 11 is provided immediately downstream of the throttle valve 3. The intake pressure sensor 11 detects a pressure in the intake pipe 2 and the detection signal is supplied to the ECU 20.

A crank angle position sensor 12 for detecting a rotational angle of the crankshaft (not shown) of the engine 1 is connected to the ECU 20. A signal corresponding to the detected rotational angle of the crankshaft is supplied to the ECU 20. The crank angle position sensor 12 includes a cylinder discrimination sensor which outputs a pulse (hereinafter referred to as "CYL pulse") at a predetermined angle position of a specific cylinder of the engine 1. The crank angle position sensor 12 also includes a TDC sensor, which outputs a TDC pulse at a crank angle position of a predetermined crank angle before a top dead center (TDC) starting an intake stroke in each cylinder (i.e., at every 120-degree crank angle in the case of a six-cylinder engine), and a CRK sensor for generating one pulse (hereinafter referred to as "CRK pulse") with a crank angle period (e.g., period of 6 degrees, shorter than the period of generation of the TDC pulse). The CYL pulse, the TDC pulse and the CRK pulse are supplied to the ECU 20. The CYL pulse, the TDC pulse and the CRK pulse are used to control the various timings, such as the fuel injection timing and the ignition timing, and to detect an engine rotational speed NE (engine rotating speed). Further, the ECU 20 detects a misfire occurring in the engine 1 based on a time interval of the generated CRK pulse (hereinafter referred to as "time period parameter CRME").

The CRK sensor has a pulse wheel and a pickup coil. The pulse wheel is fixed on the crankshaft and has teeth formed on the outer periphery at fixed angular intervals. The pickup coil is mounted facing the pulse wheel. An alternate current signal is generated in the pickup coil with rotation of the pulse wheel, and the alternate current signal is converted to the CRK pulse so that the CRK sensor outputs the CRK pulse.

The ECU 20 includes an input circuit, a central processing unit (hereinafter referred to as "CPU"), a memory circuit, and an output circuit. The input circuit performs numerous functions, including shaping the waveforms of input signals from the various sensors; correcting the voltage levels of the input signals to a predetermined level; and converting analog signal values into digital signal values. The memory circuit preliminarily stores various operating programs to be executed by the CPU and stores results of the computations, and the like, by the CPU. The output circuit supplies control signals to the fuel injection valve 4, and the like. The CPU in the ECU 20 performs the misfire detection described below.

The basic configuration of the misfire determination method in this embodiment is the same as that of the method described in Japanese Patent Laid-open No. 2007-198368. In this embodiment, the detection timing (reference timing) of a reference engine rotational speed (reference value) and the start timing of the integration period for integrating a relative speed parameter is set according to the ignition timing IGLOG. The relative speed parameter corresponds to a difference between the reference value and the engine rotational speed. Further, in this embodiment, the determination parameters (a first determination parameter MFPARAMA or a second determination parameter MFPARAMB) for performing the misfire determination are calculated with two methods, and the misfire determination is performed using one of the two determination parameters which is suitably selected according to the engine operating condition, or using both of the two determination parameters.

FIG. 2 is a time chart showing changes in a relative rotational speed OMGREF upon occurrence of a misfire. The relative rotational speed OMGREF is obtained by using the engine rotational speed at the compression top dead center as a reference value (the horizontal axis indicates the crank angle CA). The broken line L1 corresponds to a state where the ignition timing IGLOG is not retarded, and the solid line L2 corresponds to a state where the ignition timing IGLOG is retarded from the compression top dead center. As shown in FIG. 2, the relative rotational speed OMGREF upon misfire occurrence increases when the ignition timing is retarded. Accordingly, the possibility of erroneous determination that the normal combustion is carried out becomes higher although the misfire has actually occurred.

FIG. 3(a) shows changes in the engine rotational speed OMG when a misfire occurs in the cylinder which is in the combustion stroke during a period from 120 degrees to 240 degrees of the crank angle CA, in the state where the ignition timing is retarded. In FIG. 3(a). OMGTDC is a reference value of the engine rotational speed, and TINTG is an integration period which is set so as to coincide with the combustion stroke of each cylinder. It is indicated that the rotational speed OMG slightly increases in the starting portion (CA=120-150 degrees) of the combustion stroke of the misfire cylinder due to retarding the ignition timing.

Therefore, in this embodiment, the start timing of the integration period for integrating a relative rotational speed OMGREF (=OMG−OMGTDC) is set, as indicated in FIG. 3(b), to CAIS1 (=CARTD), CAIS2 (=120+CARTD), CAIS3 (=240+CARTD), . . . and the rotational speed reference value OMGTDC is set to a rotational speed at the start timing CAIS (hereinafter referred to as "ignition timing dependent correction"). CARTD indicated in FIG. 3(b) is a correction angle corresponding to the retard amount of the ignition timing IGLOG. In this embodiment, the time period parameter CRME is detected at intervals of 6 degrees of the crank angle. Accordingly, the ignition timing dependent correction is actually performed using an ignition timing index IGOFST which is obtained by digitizing the correction angle with the 6-degree period.

FIGS. 4 and 5 show a flowchart of a misfire determination process for performing the misfire determination based on the time period parameter CRME detected by the CRK sensor. The misfire determination process is executed by the CPU in the ECU 20 in synchronism with the TDC pulse generation. The time period parameter CRME(i), which is a time interval of the CRK pulse generated at every six degrees of the crank angle, is detected and the data of the detected time period parameter CRME(i) corresponding to an angular range of 1440 degrees of the crank angle (i=0-240) are stored in a buffer memory in the memory circuit. Further, if a cylinder discrimination number, which is numbered in the order of ignition, is expressed by "k" (=1 to 6) and a number of data corresponding to one TDC period is expressed by "NTDC" (NTDC=20 in this embodiment), calculations in which the parameter "i" takes values from (k−1)NTDC to (kNTDC−1) or calculations in which the parameter "i" takes values from {(k−1)NTDC+120} to {(kNTDC−1)+120} are performed by one execution of the process. For example, when the process performs the calculations corresponding to the first cylinder (k=1), the parameter "i" takes values from "0" to "19" or values from "120" to "139", and when the process performs the calculations corresponding to the third cylinder (k=3), the parameter "i" takes values from "40" to "59" or values from "160" to "179".

In step S11, the time period parameter CRME(i) is converted to a rotational speed OMG(i) [rad/s] by the following equation (1).

$$OMG(i) = D\theta / CRME(i) \quad (1)$$

where D θ is an angular interval 720/ND [degrees] of measuring the time period parameter CRME. D θ is equal to "π/30" [rad] in this embodiment.

In step S12, a top dead center rotational speed OMGTDC is set to a rotational speed at the time the piston of the cylinder subjected to the determination is positioned at the compression top dead center. Specifically, the top dead center rotational speed OMGTDC is set to OMG{(k−1) NTDC} or OMG{((k−1)NTDC+120}.

In step S13, a change amount DELTAOMGTDCA of the rotational speed OMG(i) in the period of 720 degrees of the crank angle is calculated by the following equation (2) (DELTAOMGTDCA is hereinafter referred to as "first change amount"). The first change amount DELTAOMGT-DCA is calculated as a speed change amount in the 720-degree period which is located at the center of the 1440-degree crank angle period, as shown in FIG. 6.

$$DELTAOMGTDCA = OMG(180) - OMG(60) \quad (2)$$

In step S14, a change amount DELTAOMGTDCB of the rotational speed OMG(i) in the period of 1440 degrees of the crank angle is calculated by the following equation (3) (refer to FIG. 6) (DELTAOMGTDCB is hereinafter referred to as "second change amount").

$$DELTAOMGTDCB = OMG(240) - OMG(0) \quad (3)$$

In step S15, the top dead center rotational speed OMGTDC is applied to the following equation (4) to calculate an inertial force rotational speed OMGI(i). The inertial force rotational speed OMGI(i) is a parameter indicative of the speed changing component which is inevitably generated by rotation of the engine 1, and is calculated according to a total mass of reciprocating parts (pistons and connecting rods) of the engine 1, a length of the connecting rod, a crank radius, and an inertia moment of the rotating parts driven by the engine 1, such as a crank pulley, a torque converter, and a lockup clutch. "K" in the equation (4) is a constant set to a predetermined value, and the inertia moment I is previously calculated according to the engine specification. FCR(i) is a combustion correlation function for eliminating the influence of disturbance, and given by the following equation (5) in this embodiment. It is to be noted that the specific calculation method of the inertial force rotational speed OMGI(i) is disclosed in Japanese Patent Laid-open No. 2007-198368 described above. "N" in the equation (5) is a number of cylinders, which is "6" in this embodiment.

$$OMGI(i) = K \times OMGTDC \times (-2) \times FCR(i)/3I \quad (4)$$

$$FCR(i) = \{1 - \cos(N \cdot D\theta \cdot i/2)\}/2 \quad (5)$$

In step S16, an IGOFST table shown in FIG. 7 is retrieved according to the ignition timing IGLOG (which is defined by an advance amount from the crank angle position corresponding to the compression top dead center), to calculate an ignition timing index IGOFST. The IGOFST table is set so that the ignition timing index IGOFST increases as the ignition timing IGLOG is further retarded (as the retard amount increases).

In step S17, a 720-degree filtering is performed with the following equation (6) to compensate the influence of the inertial force rotational speed OMGI(i) and to calculate a first corrected rotational speed OMGMA(i+IGOFST). The 720-degree filtering is defined as extracting a changing component over a comparatively short period by canceling a linearly changing component in one combustion cycle period. The 720-degree filtering is performed to eliminate a rotational speed changing component due to a torque applied to the engine from a load on the engine (a torque applied from wheels of the vehicle and auxiliary components driven by the engine 1, a torque due to the friction of the sliding parts of the engine 1, or the like). If the index parameter i is equal to or greater than "120", the first corrected rotational speed OMGMA(i+IGOFST) is calculated with the following equation (6a).

$$OMGMA(i+IGOFST) = \\ OMG(i+IGOFST) - DELTAOMGTDCA \times D\theta \times i/4\pi - OMGI(i) \quad (6)$$

$$OMGMA(i+IGOFST) = OMG(i+IGOFST) - \\ DELTAOMGTDCA \times D\theta \times (i-120)/4\pi - OMGI(i) \quad (6a)$$

In step S18, a 1440-degree filtering is performed with the following equation (7) to compensate the influence of the inertial force rotational speed OMGI(i) and to calculate a second corrected rotational speed OMGMB(i+IGOFST). The second corrected rotational speed OMGMB(i+IG-OFST) is applied, as described afterward, to the misfire determination in the warming-up idling operating condition immediately after the cold start of the engine 1.

$$OMGMB(i+IGOFST) = OMG(i+IGOFST) - \\ DELTAOMGTDCB \times D\theta \times i/8 - OMGI(i) \quad (7)$$

In step S19, a first relative rotational speed OMGREFA (i+IGOFST) is calculated by the following equation (8).

$$OMGREF(i+IGOFST) = OMGMA(i+IGOFST) - \\ OMGMATDC \quad (8)$$

where OMGMATDC is a first reference rotational speed which corresponds to the first corrected rotational speed at a reference timing (=(k−1)NTDC+IGOFST or (k−1)NTDC+ 120+IGOFST) when the piston of the cylinder subjected to the determination is positioned at the compression top dead center (the top dead center from which the combustion stroke starts).

In step S20, a second relative rotational speed OMGREFB(i+IGOFST) is calculated by the following equation (9).

$$OMGREFB(i+IGOFST) = OMGMB(i+IGOFST) - \\ OMGMBTDC \quad (9)$$

where OMGMBTDC is a second reference rotational speed and corresponds to the second corrected rotational speed at the reference timing (=(k−1)NTDC+IGOFST or (k−1) NTDC+120+IGOFST) when the piston of the cylinder subjected to the determination is positioned in the vicinity of the compression top dead center (the top dead center from which the combustion stroke starts).

In step S21, the first relative rotational speed OMGREFMA(i+IGOFST) calculated in step S19 and the combustion correlation function FCR(i) (the equation (5)) are applied to the following equation (10) to calculate a first modified relative rotational speed OMGREFMA(i+IG-OFST).

$$OMGREFMA(i+IGOFST) = OMGREFA(i+IGOFST) \times \\ FCR(i) \quad (10)$$

In step S22, the second relative rotational speed OMGREFMB(i+IGOFST) calculated in step S20 and the combustion correlation function FCR (i) are applied to the following equation (11) to calculate a second modified relative rotational speed OMGREFMB(i+IGOFST).

$$OMGREFMB(i+IGOFST) = OMGREFB(i+IGOFST) \times \\ FCR(i) \quad (11)$$

In step S23, the first modified relative rotational speed OMGREFMA(i+IGOFST) is applied to the following equation (12) or equation (12a) to calculate a first determination parameter MFPARAMA(k). The calculation for integrating the first modified relative rotational speed OMGREFMA(i+ IGOFST) corresponding to the rotational speed OMG(i+ IGOFST) detected during the integration period of the cylinder subjected to the misfire determination is performed by the equation (12) or (12a). The equation (12a) is used when the index parameter i takes a value which is equal to or greater than "120".

[Eq. 1]

$$MFPARAMA(k) = \sum_{i=(k-1)NTDC}^{kNTDC-1} OMGREFMA(i + IGOFST) \quad (12)$$

$$MFPARAMA(k) = \sum_{i=(k-1+N)NTDC}^{(k+N)NTDC-1} OMGREFMA(i + IGOFST) \quad (12a)$$

In step S24, the second modified relative rotational speed OMGREFMB(i+IGOFST) is applied to the following equation (13) or equation (13a) to calculate a second determination parameter MFPARAMB(k). The calculation for integrating the second modified relative rotational speed OMGREFMB(i+IGOFST) corresponding to the rotational speed OMG(i+IGOFST) detected during the integration period of the cylinder subjected to the misfire determination is performed by the equation (13) or (13a). The equation (13a) is used when the index parameter i takes a value which is equal to or greater than "120".

[Eq. 2]

$$MFPARAMB(k) = \sum_{i=(k-1)NTDC}^{kNTDC-1} OMGREFMB(i + IGOFST) \quad (13)$$

$$MFPARAMB(k) = \sum_{i=(k-1+N)NTDC}^{(k+N)NTDC-1} OMGREFMB(i + IGOFST) \quad (13a)$$

In next step S31 (FIG. 5), it is determined whether or not the first determination parameter MFPARAMA(k) is greater than a first determination threshold value MFJUDA (e.g., "0"). If the answer to step S31 is affirmative (YES), it is determined that the normal combustion has been performed, and a misfire flag FMF(k) is set to "0" (step S35). On the other hand, if the first determination parameter MFPARAMA(k) is equal to or less than MFJUDA, it is determined whether or not a warming-up operation flag FCSTA is "1" (step S32). The warming-up operation flag FCSTA is set to "1" when the engine 1 is in the warming-up idling operating condition immediately after the cold start.

If FCSTA is equal to "0" in step S32, i.e., the engine 1 is not in the warming-up idling operating condition, it is determined that a misfire has occurred in the cylinder corresponding to the cylinder identifying number k (k=1, 2, 3, 4, 5, and 6 respectively correspond to #1 cylinder, #5 cylinder, #3 cylinder, #6 cylinder, #2 cylinder, and #4 cylinder in this embodiment), and a misfire flag FMF(k) is set to "1" (step S34).

If FCSTA is equal to "1" in step S32, i.e., the engine 1 is in in the warming-up idling operating condition, it is determined whether or not the second determination parameter MFPARAMB(k) is greater than a second determination threshold value MFJUDB (step S33). The second determination threshold value MFJUDB is set to a value which is less than the first determination threshold value MFJUDA. If the answer to step S33 is affirmative (YES), it determined that the normal combustion or the irregular combustion is performed. Thereafter, the process proceeds to step S35 described above. On the other hand, if MFPARAMB(k) is equal to or less than MFJUDB, it determined that a misfire has occurred in the cylinder corresponding to the cylinder identifying number k. Thereafter, the process proceeds to step S34 described above.

In step S36, it is determined whether or not the cylinder identifying number k is equal to the cylinder number N. If the answer to step S36 is negative (NO), the cylinder identifying number k is incremented by "1" (step S38). If k is equal to N, the cylinder identifying number k is returned to "1" (step S37).

FIG. 8 shows measured data of the misfire determination parameter MFPARAMA when changing the ignition timing IGLOG in the retarding direction. FIG. 8(a) corresponds to an example where the ignition timing dependent correction with the ignition timing index IGOFST is not performed, and FIG. 8(b) corresponds to this embodiment in which the ignition timing dependent correction is performed. In FIGS. 8(a) and 8(b), the white circles (○) correspond to the normal combustion (or the irregular combustion), and the black circles (●) correspond to the misfire. Referring to FIGS. 8(a) and 8(b), the following point is confirmed: it is difficult to determine the misfire with sufficient accuracy when not performing the ignition timing dependent correction (FIG. 8(a)), but the misfire determination can accurately be performed by performing the ignition timing dependent correction.

As described above, according to the process of FIGS. 4 and 5, the first corrected rotational speed OMGMA is calculated by the 720-degree filtering, and the first relative rotational speed OMGREFA is calculated as a difference between the first corrected rotational speed OMGMA and the first reference rotational speed OMGMATDC corresponding to the first corrected rotational speed OMGMA at the reference timing. Further, the first modified relative rotational speed OMGREFMA is calculated by multiplying the first relative rotational speed OMGREFA with the combustion correlation function FCR, and the first determination parameter MFPARAMA(k) is calculated by integrating the first modified relative rotational speed OMGREFMA within the integration period TINTG. The misfire determination is performed according to the comparison result of the first determination parameter MFPARAMA and the first determination threshold value MFJUDA. In addition, the ignition timing dependent correction is performed with respect to the reference timing and the start timing of the integration period TINTG. Accordingly, when the ignition timing is changed in the retarding direction, the value of the first determination parameter MFPARAMA upon misfire occurrence is prevented from approaching the value of the normal combustion, and the determination can accurately be performed regardless of changes in the ignition timing.

Further, the second corrected rotational speed OMGMB is calculated by the 1440-degree filtering, and the second relative rotational speed OMGREFB is calculated as a difference between the second correction rotational speed OMGMB and the second reference rotational speed OMGMBTDC. Further, the second modified relative rotational speed OMGREFMB is calculated by multiplying the second relative rotational speed OMGREFB with the combustion correlation function FCR, and the second determination parameter MFPARAMB(k) is calculated by integrating the second modified relative rotational speed OMGREFMB(i+ IGOFST) within the integration period TINTG.

When the possibility of misfire occurrence is determined to be high by the first determination parameter MFPARAMA(k) and the engine 1 is in the warming-up idling operating condition immediately after the cold start, the misfire determination is performed by the second determination parameter MFPARAMB(k). The average change amount (DELTAOMGTDCB/8 π) calculated using the second change amount DELTAOMGTDCB in the period of 1440 degrees of the crank angle which is longer than the period of 720 degrees of the crank angle, is hardly influenced by a sudden irregular combustion. Accordingly, the second corrected rotational speed OMGMB is hardly influenced by such irregular combustion with respect to the cylinders other than the cylinder in which the irregular combustion has abruptly occurred. Therefore, by using the second determination parameter MFPARAMB, the misfire determination can accurately be performed in the warming-up idling operating condition where the irregular combustion may easily occur. Further, in the operating condition other than the warming-up idling operating condition, by performing the misfire determination using the first determination parameter MFPARAMA, which is based on the first corrected rotational speed OMGMA(i+IGOFST) which is calculated according the average change amount (DELTAOMGTDCA/4 π) calculated using the first change amount DELTAOMGTDCA in the 720-degree crank angle period, the misfire determination can accurately be performed, for example, in the transient operating condition of the engine 1.

In this embodiment, the second predetermined period (claim 2) is set to 1440 degrees of the crank angle, and the second corrected rotational speed OMGMB is calculated by using the average change amount (DELTAOMGTDCB/8 π) obtained by averaging a change amount of the rotational speed in the period of 1440 degrees. Alternatively, the second predetermined period may be set to a period which is longer than 1440-degree period. It is to be noted that the second predetermined period is preferably set to a period obtained by multiplying 720 degrees with an integer.

FIG. 9(a) shows changes in the first determination parameter MFPARAMA calculated using the 720-degree filtering in the state (for example, an operating condition immediately after the cold start) where the irregular combustion and the misfire occur at random. In FIG. 9(a), the black circles (●) indicate the values upon occurrence of the misfire, and the white circles (○) indicate the values upon occurrence of the irregular combustion. According to this figure, it is confirmed that it is difficult to determine the misfire distinguishing from the irregular combustion with the 720-degree filtering.

FIG. 9(b) shows changes in the second determination parameter MFPARAMB calculated by performing the 1440-degree filtering in the similar operating condition as FIG. 9(a), and the black circles (●) indicate the values upon occurrence of the misfire, and the white circles (○) indicate the values upon occurrence of the irregular combustion. Although there are still some cases that the value upon occurrence of the misfire exceeds the value upon occurrence of the irregular combustion, it is confirmed that the situation is considerably improved compared with the first determination parameter MFPARAMA shown in FIG. 9(a).

FIG. 9(c) shows changes in a second determination parameter MFPARAMB' which is obtained by making the second predetermined period longer, i.e., 2880 degrees. As apparent from FIG. 9(c), the longer second predetermined period makes it possible to accurately determine the misfire distinguishing from the irregular combustion.

In this embodiment, the crank angle position sensor 12 and the ECU 20 constitute the rotational speed parameter detecting means, and the ECU 20 constitutes the first correcting means, the second correcting means, the first relative speed parameter calculating means, the second relative speed parameter calculating means, the first determination parameter calculating means, the second determination parameter calculating means, and the determining means. Specifically, steps S13 and S17 of FIG. 4 correspond to the first correcting means, steps S14 and S18 correspond to the second correcting means, step S19 corresponds to the first relative speed parameter calculating means, step S20 corresponds to the second relative speed parameter calculating means, steps S23 and S24 respectively correspond to the first determination parameter calculating means and the second determination parameter calculating means, and steps S31-S35 of FIG. 5 correspond to the determining means.

The present invention is not limited to the embodiment described above, and various modifications may be made. For example, in the above-described embodiment, the time period parameter CRME is converted to the rotational speed OMG to perform the misfire determination. Alternatively, the misfire determination may be performed using the time period parameter CRME itself as the rotational speed parameter, as shown in Japanese Patent Laid-open No. 2007-198368.

Further, in the above-described embodiment, the determination is performed using the second determination parameter MFPARAMB in the warming-up operating condition immediately after the cold start of the engine 1. Alternatively, the determination using the second determination parameter MFPARAMB may be performed in the operating condition where the air-fuel ratio is, in the idling operating condition of the engine 1, set to a value which is leaner than the stoichiometric ratio to perform the lean burn operation.

Further, the process shown in FIG. 5 may be modified as shown in FIG. 10. In FIG. 10, it is at first determined whether or not the warming-up operation flag FCSTA is "1" (step S32). If FCSTA is equal to "0", the determination using the first determination parameter MFPARAMA(k) is performed (step S31). If FCSTA is equal to "1", the determination using the second determination parameter MFPARAMB(k) is performed (step S33).

Further, in the above-described embodiment, the determination parameters MFPARAMA and MFPARAMB are calculated by integrating the modified relative rotational speeds OMGREFMA and OMGREFMB which are obtained by modifying the relative rotational speeds OMGREFA and OMGREFB with the combustion correlation function FCR. Alternatively, the determination parameters MFPARAMA and MFPARAMB may be calculated by integrating the relative rotational speeds OMGREFA and OMGREFB which are not modified with the combustion correlation function FCR. In this case, FCR(i) of the equation (4) for calculating the inertial force rotational speed OMGI(i) is set to a constant value (for example, "1").

Further, in the above-described embodiments, the example in which the present invention is applied to the 6-cylinder engine, is shown. The present invention is applicable to an engine having any number of cylinders. Further, the present invention is also applicable to the misfire determination for a gasoline engine in which fuel is directly injected into the combustion chamber. Further, the present invention is also applicable to the misfire determination for a watercraft propulsion engine such as an outboard engine having a vertically extending crankshaft.

DESCRIPTION OF REFERENCE NUMERALS

1 Internal combustion engine
12 Crank angle position sensor (rotational speed parameter detecting means)
20 Electronic control unit (rotational speed parameter detecting means, first correcting means, second correcting means, first relative speed parameter calculating means, second relative speed parameter calculating means, first determination parameter calculating means, second determination parameter calculating means, determining means)

The invention claimed is:

1. A misfire detecting apparatus for an internal combustion engine, having rotational speed parameter detecting means for detecting a rotational speed parameter indicative of a rotational speed of said engine, and detecting a misfire of said engine based on the detected rotational speed parameter, the misfire detecting apparatus comprising:
   first correcting means for calculating a first average change amount of the rotational speed parameter in a first predetermined period, calculating an inertia speed changing component which is generated with rotation of said engine, and calculating a first corrected rotational speed parameter by correcting the rotational speed parameter according to the first average change amount and the inertia speed changing component;
   first relative speed parameter calculating means for calculating a first relative speed parameter according to a difference between a first reference value and the first corrected rotational speed parameter, the first reference value being the first corrected rotational speed parameter corresponding to the rotational speed parameter which is detected at a reference timing at which a piston of a cylinder, which is subjected to the misfire determination, is positioned in the vicinity of the compression top dead center;
   first determination parameter calculating means for calculating a first determination parameter by integrating the first relative speed parameter for an integration period corresponding to 720/N degrees of a crank angle ("N" is a number of cylinders of said engine); and
   determining means for performing a misfire determination based on the first determination parameter,
   wherein the reference timing and a start timing of the integration period are set according to the ignition timing of said engine so that a retardation amount of the reference timing and the start timing of the integration period is increased as a retard amount of the ignition timing increases.

2. A misfire detecting apparatus according to claim 1, further comprising:
   second correcting means for calculating a second average change amount of the rotational speed parameter in a second predetermined period which is longer than the first predetermined period, calculating the inertia speed changing component, and calculating a second corrected rotational speed parameter by correcting the rotational speed parameter according to the second average change amount and the inertia speed changing component;
   second relative speed parameter calculating means for calculating a second relative speed parameter according to a difference between a second reference value and the second corrected rotational speed parameter, the second reference value being the second corrected rotational speed parameter corresponding to the rotational speed parameter which is detected at the reference timing; and
   second determination parameter calculating means for calculating a second determination parameter by integrating the second relative speed parameter for the integration period,
   wherein said determining means performs the misfire determination based on the second determination parameter when the engine is in a predetermined operating condition, and said determining means performs the misfire determination based on the first determination parameter when the engine is in an operating condition other than the predetermined operating condition.

3. A misfire detecting apparatus according to claim 2, wherein the predetermined operating condition is a warming-up idling operating condition immediately after a cold start of said engine.

4. A misfire detecting method for an internal combustion engine, for detecting a rotational speed parameter indicative of a rotational speed of said engine, and detecting a misfire of said engine based on the detected rotational speed parameter, said misfire detecting method comprising the steps of:
   a) calculating a first average change amount of the rotational speed parameter in a first predetermined period;
   b) calculating an inertia speed changing component which is generated with rotation of said engine;
   c) calculating a first corrected rotational speed parameter by correcting the rotational speed parameter according to the first average change amount and the inertia speed changing component;
   d) calculating a first relative speed parameter according to a difference between a first reference value and the first corrected rotational speed parameter, the first reference value being the first corrected rotational speed parameter corresponding to the rotational speed parameter which is detected at a reference timing at which a piston of a cylinder, which is subjected to the misfire determination, is positioned in the vicinity of the compression top dead center;
   e) calculating a first determination parameter by integrating the first relative speed parameter for an integration period corresponding to 720/N degrees of a crank angle ("N" is a number of cylinders of said engine); and
   f) performing a misfire determination based on the first determination parameter,
   wherein the reference timing and a start timing of the integration period are set according to the ignition timing of said engine so that a retardation amount of the reference timing and the start timing of the integration period is increased as a retard amount of the ignition timing increases.

5. A misfire detecting method according to claim 4, further comprising the steps of:
   g) calculating a second average change amount of the rotational speed parameter in a second predetermined period which is longer than the first predetermined period;
   h) calculating a second corrected rotational speed parameter by correcting the rotational speed parameter according to the second average change amount and the inertia speed changing component;
   i) calculating a second relative speed parameter according to a difference between a second reference value and the second corrected rotational speed parameter, the second reference value being the second corrected rotational speed parameter corresponding to the rotational speed parameter which is detected at the reference timing; and j) calculating a second determination parameter by integrating the second relative speed parameter for the integration period, wherein the misfire determination is performed based on the second determination parameter when the engine is in a predetermined operating condition, and the misfire determination is performed based on the first determination parameter when the engine is in an operating condition other than the predetermined operating condition.

6. A misfire detecting method according to claim 5, wherein the predetermined operating condition is a warming-up idling operating condition immediately after a cold start of said engine.

7. A computer program embodied on a non-transitory computer-readable storage medium for causing a computer to implement a misfire detecting method for an internal combustion engine, for detecting a rotational speed parameter indicative of a rotational speed of said engine, and detecting a misfire of said engine based on the detected rotational speed parameter, said misfire detecting method comprising the steps of:

a) calculating an average change amount of the rotational speed parameter in a first predetermined period and an inertia speed changing component which is generated with rotation of said engine;

b) calculating a first corrected rotational speed parameter by correcting the rotational speed parameter according to the average change amount and the inertia speed changing component;

c) calculating a first relative speed parameter according to a difference between a first reference value and the first corrected rotational speed parameter, the first reference value being the first corrected rotational speed parameter corresponding to the rotational speed parameter which is detected at a reference timing at which a piston of a cylinder, which is subjected to the misfire determination, is positioned in the vicinity of the compression top dead center;

d) calculating a first determination parameter by integrating the first relative speed parameter for an integration period corresponding to 720/N degrees of a crank angle ("N" is a number of cylinders of said engine); and e) performing a misfire determination based on the first determination parameter, wherein the reference timing and a start timing of the integration period are set according to the ignition timing of said engine so that a retardation amount of the reference timing and the start timing of the integration period is increased as a retard amount of the ignition timing increases.

8. A computer program according to claim 7, wherein said misfire detecting method further comprises the steps of:

f) calculating an average change amount of the rotational speed parameter in a second predetermined period which is longer than the first predetermined period, and the inertia speed changing component;

g) calculating a second corrected rotational speed parameter by correcting the rotational speed parameter according to the average change amount and the inertia speed changing component;

h) calculating a second relative speed parameter according to a difference between a second reference value and the second corrected rotational speed parameter, the second reference value being the second corrected rotational speed parameter corresponding to the rotational speed parameter which is detected at the reference timing; and i) calculating a second determination parameter by integrating the second relative speed parameter for the integration period, wherein the misfire determination is performed based on the second determination parameter when the engine is in a predetermined operating condition, and the misfire determination is performed based on the first determination parameter when the engine is in an operating condition other than the predetermined operating condition.

9. A computer program according to claim 8, wherein the predetermined operating condition is a warming-up idling operating condition immediately after a cold start of said engine.

* * * * *